UNITED STATES PATENT OFFICE 2,126,560

DERIVATIVES OF CYCLOHEXYLAMINE AND USES THEREFOR

Lucas P. Kyrides, Webster Groves, Mo., assignor to Monsanto Chemical Company, St. Louis, Mo., a corporation of Delaware No Drawing. Application October 7, 1935, Serial No. 43,924

5 Claims. (Cl. 106—40)

The present invention relates to a new class of chemical compounds and to their use in the treatment of cellulosic compositions. It has particular relation to novel derivatives of cyclohexylamine which possess, among other valuable properties, a high compatibility with and a plasticizing action upon cellulosic compositions.

The main objects of the invention are to provide compounds which may easily and economically be prepared, which are highly compatible with such cellulosic compositions as cellulose nitrate, which when incorporated therein provide an intimate and permanent mixture of high flexibility and mechanical strength, which in cellulosic compositions are highly resistant to discoloration by light and which are substantially non-odorous and non-volatile.

These and other objects will be apparent from perusal of the appended specification and the accompanying claims.

Cellulosic compositions such as cellulose nitrate, which are commonly used in the preparation of lacquers, molding materials and photographic films, are characterized by the fact that in the dry state they are excessively hard and brittle and upon subjection to relatively slight flexure or extension, they check and break. For purposes of overcoming this defect, it is customary to incorporate into the compositions a modifying agent termed a plasticizer which tends permanently to increase flexibility and extensibility of the product.

Historically the first modifying agent of this type was ordinary camphor which, when incorporated in sufficient amounts (20–50%), provides a material of adequate and permanent flexibility for most purposes. However camphor as a plasticizer is objectionable in certain respects. For example, it is comparatively expensive to obtain and it imparts a characteristic odor to the product, which in some cases is objectionable. Furthermore, upon exposure to light and air, it exhibits a pronounced tendency to assume a yellow tinge which, in many cases, is highly objectionable. In view of these defects of camphor as a plasticizer for cellulosic materials, a relatively intense search has been conducted by various manufacturers over a long period of time for purposes of developing a suitable substitute therefor. A great many substances have been proposed, but heretofore none of them has proved to be entirely satisfactory. Only a relatively few of the proposed materials exhibit adequate compatibility with cellulosic substances to admit of their incorporation in sufficient quantities to insure sufficient plasticization. In many cases, even though the plasticizing action was good, the substances were so sensitive to discoloration by light as to prohibit the use of the material in commercial practice. Furthermore, many proposed plasticizers were of such high volatility that within the relatively short period of their addition to the cellulosic compounds they had to a considerable extent evaporated, thus leaving the cellulosic material in substantially unplasticized state. In view of these objectionable features of the various camphor substitutes, camphor has continued to be a leading plasticizer for cellulosic materials in spite of the great amount of time and labor expended in a search for a more satisfactory plasticizer.

The present invention involves the discovery of a new class of compounds obtained by acylation of an aliphatic diamine containing a cyclohexyl group directly attached to each nitrogen atom, and it further involves the discovery that these materials possess properties eminently fitting them for use as plasticizers of nitrocellulose in place of camphor. These compounds are of the type represented by the general formula

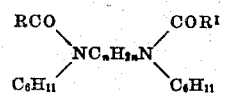

where $n$ is any whole number and R and $R^I$ are hydrocarbon groups.

The preparation of compounds of this type is quite simple and involves chemical reactions, the general type of which is well understood by those skilled in the art. A preferred method involves the initial reaction of a di-halogenated aliphatic compound, such as ethylene dichloride with cyclohexylamine to form an amino compound of the type of symmetrical dicyclohexyl ethylene diamine. This compound is then converted into the diacyl derivative by reaction in conventional manner with the anhydride of a carboxylic acid, a typical example of the latter being acetic anhydride. It is to be understood that in the first reaction a material excess of cyclohexylamine may be employed and that the acid anhydride should also be preferably in slight excess of the theoretical value in the second reaction. The excess cyclohexylamine of course should be removed, for example by distillation, prior to acetylation.

The following constitutes a specific example illustrating the preparation of a material constituting the subject matter of the invention. Cyclohexylamine and ethylene dichloride in the molar ratio of approximately 5 to 1 were reacted. Preferably the ethylene dichloride was added over a period of approximately three hours to the cyclohexylamine at near its boiling point, while agitating it. Heating and agitation were continued for an additional two hours after all of the ethylene dichloride had been incorporated. The bath was then cooled to about 100° C. and 740 parts by weight of 50% sodium hydroxide and 700 parts by weight of water were added. An oily layer resulted and this was separated and the excess cyclohexylamine was distilled off. In order to remove any sodium chloride contained in the dicyclohexyl ethylene diamine left after distilling off the cyclohexylamine, the batch was poured into hot water, agitated and the oil separated. If cooled, the new compound formed a hydrate which was recovered by filtration. It was then dehydrated by heating, preferably in vacuum. Vacuum distillation gave 925 parts by weight, which represents a yield of 90.9% of the theoretical of dicyclohexyl ethylene diamine. This product is so pure that it may be subjected without further purification to acetylation. The product boils at 184–186° C. at about 25 m. m.; at 318–320° C. under atmospheric pressure. It is a strongly alkaline substance.

The step of acetylating the dicyclohexyl ethylene diamine may proceed as follows. The 925 parts of dicyclohexyl ethylene diamine, prepared as above described, were charged into a suitable reaction vessel, which preferably is fitted with a reflux condenser. To this charge were added 1010 parts by weight of acetic acid anhydride. This represented an excess of acetic anhydride over dicyclohexyl ethylene diamine of approximately 20%. The mixture was heated in an oil bath at a temperature of approximately 125°–140° C. for a period of about 12 hours. The product after cooling below 100° was quenched in ice water and the product which was of granular nature was filtered off and washed with water. This granular material was dissolved in 1400 parts of boiling alcohol treated with 12 parts of a suitable decolorizing charcoal and filtered after some time. The filtrate was treated with 1400 parts of hot water. The diluted solution was cooled to about 5° C. and then filtered.

The crystals, for purposes of further purification, were redissolved in 600 parts of boiling alcohol, and treated with an additional 5 parts of decolorizing charcoal, filtered and then treated with 800 parts of hot water. The water mixture was again cooled to 5° C. after which the crystals were removed by filtration. A yield of 959 parts, approximately 87.5% of the theoretical value of dry material, was obtained in this manner.

The white crystalline product is found to have a melting point of 152–153.5° C.

If the material is to be employed as a plasticizer of nitrocellulose, it is incorporated in substantially the same manner and substantially the same proportions as camphor which has heretofore been employed for this purpose. For example, an excellent product may be obtained by the addition of 3 parts by weight of diacetyl dicyclohexyl ethylene diamine to 10 parts by weight of nitrocellulose admixed with 5 parts by weight of ethyl alcohol. This incorporation should be effected upon conventional rollers, which for best results should be heated to a temperature of about 60–80° C.

The nitrocellulose is permanently homogenized and is characterized by little or no odor and by an unusual degree of resistance to discoloration by the action of light. In a test to determine this light resistance, three samples of material were prepared. The first of these was a blank containing only nitrocellulose. The second was similar in every respect to the first except that it contained the usual amount of camphor required for plasticization, while the third was similar to the second except that the camphor was replaced by diacetyl dicyclohexyl ethylene diamine prepared as above described. These samples were exposed to identical intensities of ultra-violet light from an electric arc for a period of one hour. At the end of this time it was found that the material containing camphor had developed a very pronounced yellow color. The change in color in the blank could barely be detected. There was no detectable difference in the color of the blank and the material containing the diacetyl dicyclohexyl ethylene diamine.

It is to be understood that diacetyl dicyclohexyl ethylene diamine merely constitutes a typical example of a material which is embraced within the purview of the present invention. It will be appreciated that ethylene dichloride in the reaction may be replaced by the dichlorides or other halogenated derivatives of aliphatic hydrocarbons, examples of which are butylene dichloride, propylene dichloride, etc. Cyclohexylamine may be replaced by derivatives of cyclohexylamine such as methyl cyclohexylamine and the like and the acetic acid anhydride may be replaced by the anhydrides of other carboxylic acids such as the anhydrides of propionic and butyric acid.

The primary materials required for the preparation of the new compounds are relatively inexpensive to obtain and the reactions involved in the preparation of the new materials are simple and easy to effect. The resultant products, by reason of their high compatibility with nitrocellulose and the permanence and resistance to discoloration of the materials when incorporated into nitrocellulose make the compounds highly valuable as substitutes for camphor.

The new compounds may be employed as plasticizers in almost any of the conventional lacquer materials which contain as a base cellulosic materials such as nitrocellulose. The compounds are also excellent plasticizers for compositions designed to be shaped by molding or pressing, they may be used alone or in mixture with other plasticizers or softening agents.

Although only the preferred forms of the invention have been described and shown, it will be apparent to those skilled in the art that these forms are merely illustrative and that numerous modifications may be made therein without departure from the scope of the invention and the appended claims. Attention is directed to my co-pending application, Serial No. 217,499 filed on July 5, 1938, in which is claimed subject matter disclosed but not claimed herein.

What I claim is:

1. A composition of matter embodying nitrocellulose intimately admixed with a camphor substitute, a product obtainable by the reaction of an N-cyclohexyl N'-cyclohexyl alkyl diamine and an organic carboxylic acid anhydride.

2. A composition of matter comprising nitrocellulose and intimately admixed therewith a camphor substitute characterized in that it is a diacylated N-cyclohexyl N'-cyclohexyl alkyl diamine.

3. A composition of matter comprising nitrocellulose and intimately admixed therewith a camphor substitute characterized in that it is a diacetylated N-cyclohexyl N'-cyclohexyl alkyl diamine.

4. A composition of matter comprising nitrocellulose and intimately admixed therewith a camphor substitute characterized in that it is a diacetylated N-cyclohexyl N'-cyclohexyl ethylene diamine.

5. A composition of matter comprising nitrocellulose and intimately admixed therewith a camphor substitute corresponding to a reaction product of an N-cyclohexyl-N'-cyclohexyl alkyl diamine and an aliphatic carboxylic acid anhydride.

LUCAS P. KYRIDES.